(12) United States Patent
O'Neall et al.

(10) Patent No.: US 8,843,855 B2
(45) Date of Patent: Sep. 23, 2014

(54) DISPLAYING MAPS OF MEASURED EVENTS

(75) Inventors: Andrew J. O'Neall, Downs, IL (US); Donald L. O'Neall, Downs, IL (US)

(73) Assignee: Linx Systems, Inc., Downs, IL (US)

( * ) Notice: Subject to any disclaimer, the term of this patent is extended or adjusted under 35 U.S.C. 154(b) by 737 days.

(21) Appl. No.: 13/013,137

(22) Filed: Jan. 25, 2011

(65) Prior Publication Data

US 2011/0181598 A1 Jul. 28, 2011

Related U.S. Application Data

(60) Provisional application No. 61/336,665, filed on Jan. 25, 2010.

(51) Int. Cl.
*G06F 3/048* (2013.01)
*G06T 11/20* (2006.01)

(52) U.S. Cl.
CPC ..................................... *G06T 11/206* (2013.01)
USPC ............................ 715/854; 345/173; 345/684

(58) Field of Classification Search
CPC .... G06F 3/0488; G06F 3/04883; G06F 3/044
See application file for complete search history.

(56) References Cited

U.S. PATENT DOCUMENTS

| | | | | |
|---|---|---|---|---|
| 8,032,584 B2 * | 10/2011 | Appleton et al. | ............. | 709/201 |
| 2006/0106539 A1 * | 5/2006 | Choate et al. | ..................... | 702/2 |
| 2007/0222746 A1 * | 9/2007 | LeVine | ......................... | 345/156 |
| 2009/0160873 A1 * | 6/2009 | Kew et al. | ..................... | 345/629 |
| 2010/0023261 A1 * | 1/2010 | Bitonti et al. | ................. | 701/208 |
| 2011/0010213 A1 * | 1/2011 | Peterson et al. | .................. | 705/7 |
| 2011/0154192 A1 * | 6/2011 | Yang et al. | ..................... | 715/256 |
| 2011/0166777 A1 * | 7/2011 | Chavakula | ..................... | 701/201 |
| 2011/0270495 A1 * | 11/2011 | Knapp | ............................. | 701/50 |
| 2012/0004813 A1 * | 1/2012 | Baumgarten et al. | ........... | 701/50 |
| 2012/0047428 A1 * | 2/2012 | Nykanen et al. | .............. | 715/235 |
| 2012/0079381 A1 * | 3/2012 | Swenson et al. | .............. | 715/716 |

OTHER PUBLICATIONS

Viacheslav et al. "Listening to the Story Told by Yield Maps", Precision Agriculture, Jun. 24, 2010.*

"ADM Crop Risk Services" dated 2010 downloaded from the Internet on Jan. 24, 2011 < http://www.admers.com/ADMapping/Products.html > (2 pages).

* cited by examiner

*Primary Examiner* — David Zarka
*Assistant Examiner* — David H Chu
(74) *Attorney, Agent, or Firm* — Hickman Palermo Truong Becker Bingham Wong LLP (57) ABSTRACT

A method, computer-readable medium, and apparatus are provided for browsing maps of events of various types that occurred on a piece of land on various dates. A map is displayed on a map interface that allows a user to navigate to other maps using different types of navigation that are triggered by different types of user input. A single instance of a first type of user input triggers display of another map of the same event type as a currently displayed map. A single instance of a second type of user input triggers display of another map that is chronologically adjacent to the currently displayed map, regardless of event type. Alternately, the second type of user input triggers skipping maps of the same event type to navigate to a map of a different event type. The maps each include a graphical representation of a measurement at a given location.

28 Claims, 9 Drawing Sheets

DISPLAYING MAPS OF MEASURED EVENTS

CROSS-REFERENCE TO RELATED APPLICATIONS; BENEFIT CLAIM

This application claims the benefit of Provisional Appln. 61/336,665, filed Jan. 25, 2010, entitled METHOD OF BROWSING AND DISPLAY OF SPATIAL DATA, the entire contents of which is hereby incorporated by reference as if fully set forth herein, under 35 U.S.C. §119(e).

FIELD OF THE INVENTION

The present invention relates to displaying maps of measured events.

BACKGROUND

Mapping applications operate on a variety of devices to display maps to users. Maps may graphically represent spatial data that is generated from measurements made at particular locations. For example, a rainfall map may reflect various measurements of rainfall in a mapped area during the month of January.

Existing mapping applications may display a variety of maps to a user. To view a map, the user typically navigates through a hierarchy of file menus by providing numerous instances of user input from keypads, keyboards, various pointing devices, or other input devices to locate and select the map. Once the map is located and selected for viewing, the map is loaded into memory for display on the device. To open a new map for viewing, the user must re-navigate through the hierarchy of file menus to locate and select the new map.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings.

Each of FIGS. 3A-C is a diagram that illustrates an example map interface for displaying spatial data that is generated from measurements of an event associated with a particular date.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, computer-readable medium, and apparatus are provided for browsing maps of events of various types that occurred on a piece of land on various dates. A map is displayed on a map interface that allows a user to navigate to other maps using different types of navigation that are triggered by different types of user input. A single instance of a first type of user input triggers display of another map of the same event type as a currently displayed map. A single instance of a second type of user input triggers display of another map that is chronologically adjacent to the currently displayed map, regardless of event type. Alternately, the second type of user input triggers skipping maps of the same event type to navigate to a map of a different event type. The maps each include a graphical representation of a measurement at a given location.

In one embodiment, measurements for different types of events are stored on a non-transitory computer-readable storage medium. For example, a first set of measurements include measurements of events of a first event type that occurred on a piece of land, and a second set of measurements include measurements of events of a second event type that occurred on the piece of land. Event types may include, but are not limited to a harvest event type, a tillage event type, an event type for application of a substance, a seeding event type, an irrigation event type, a drainage event type, a scouting event type, a survey event type, or a testing event type.

In an embodiment, a currently displayed map is a marked position that corresponds to received location information. For example, the location information may be received from a global positioning system ("GPS") device that is located on the piece of land. The currently displayed map includes a first graphical representation of a first measurement for a first event of the first event type that occurred on a first date. In one embodiment, the first measurement is a measurement for the first event with respect to the marked position. Each of the maps may include several measurements for events with respect to several positions that lie on the piece of land.

The user navigates away from the currently displayed map with a single instance of user input of either a first input type or a second input type. For example, the single instance of user input could be a click, a touch gesture, a tap, a button press, a voice command, a body gesture, or an eye movement. In a particular example, a touch gesture may be a one or two finger swipe or some other hand or finger motion against a touch screen device. Inputs of different types may be inputs that are not aligned with each other. For example, a touch gesture such as a swipe to the right may be a different type of input than a touch gesture such as a swipe up. A swipe to the left and a swipe to the right may be described as the same type of input even though they trigger navigation in opposite directions.

If the single instance of user input is of the first input type, then a second map is displayed with the marked position and a second graphical representation of a second measurement for a second event of the same event type that occurred before or after the first event. In one embodiment, events of the same type are listed in order of occurrence by date, and second event is adjacent to the first event.

If the single instance of user input is of the second input type, then a third map is displayed with the marked position and a third graphical representation of a third measurement for a third event of a different event type that occurred on a potentially different date from the first event and/or the second event. In one embodiment, the different types of events are ordered in a list by date, and navigating from the first date to the third date includes navigating to a chronologically adjacent date. In one embodiment, the second event is before the third event, and the second event is skipped to find an event of a different type when navigating from the first event to the third event.

In one embodiment, maps adjacent to the currently displayed map are loaded into memory before receiving the user input to navigate away from the currently displayed map. For example, the maps may be loaded into memory upon selection and display of the currently displayed map. In one example, a map for a previous event and a map for a next event of the same event type are loaded into memory. The previous event and the next event may not be chronologically adjacent to the currently displayed event when viewed without regard to event type. In one embodiment, maps for chronologically adjacent events are also loaded into memory.

Map Interface

In one embodiment, a map interface displays a map of measurements for an event that occurred on a piece of land on a particular date. The map is generated from an index or table in a database or other data repository that contains spatial data or images. In one embodiment, the spatial data stored remotely and is provided to a mapping application over a wired or wireless network. The spatial data reflects measurements of events that have occurred with respect to particular locations on a piece of land. Graphical representations of the measurements are displayed at the particular locations on the map. In one embodiment, the graphical representations are colored pixels. For example, the map interface may display the spatial data in a color classified map view with each color having a unique assigned value or value range. In one embodiment, a measurement associated with a given location, such as a location received from a global positioning system ("GPS") device, is graphically represented in an information bar displayed separately from the map. In another embodiment, the measurement associated with the given location is graphically represented at that location on the map.

In one embodiment, in addition to a graphical representation of a measurement, the information bar includes a textual description, in plain words, of the measurement at the given location. The information bar may also include information that describes the event type. The information bar may be displayed separately from the map, or the information bar may be on top of the map. In one embodiment, an area of the viewing screen is allocated to the information bar. In various embodiments, the information bar may display information from maps that are not currently being displayed instead of or in addition to information from a map that is currently being displayed. For example, the information bar may display information about a measurement at a particular position on different maps even if only one of the different maps is currently displayed.

In one embodiment, machines moving around the mapped land collect data via GPS devices installed on the machines. For example, a planter may record seeding location and timing data to a server, and the mapping software may display the seeding data in a map via the map interface. As another example, a tractor tilling the land may send information about the positions that were tilled. The measurements may be binary, such as "land tilled" or "land not tilled," or the measurements may comprise any other type of value.

Location Information

In one embodiment, a device is in use on the piece of land being mapped, and the given location is a GPS position of the device on the piece of land. For example, a single mobile device may include a display for displaying the map and a GPS device for capturing the position that is marked on the map. In a particular example, the mobile device may be in use on a vehicle, such as a truck or a tractor that is moving across the piece of land. The position may be updated as the device moves across the piece of land. New maps may be loaded when the device moves from one piece of land to another piece of land. For example, maps of tract A are displayed when the device is located on tract A, and maps of tract B are displayed as the device enters tract B. In one embodiment, a map of tract B is loaded into memory as the location nears, or comes within a threshold distance of, tract B even if the location is still on tract A.

In another embodiment, the location is specified by a cursor position on the screen. The cursor position may be modified by a user selecting different portions of the screen. For example, the user may control the cursor with a mouse, with a finger tap, with a physical control pad, with a control pad displayed on the screen, or with some other cursor controlling user input. In one embodiment, measurements for events near, or within a threshold radius of, the cursor position are loaded into memory.

Navigating Between Maps

In one embodiment, a first type of user input triggers navigating between maps of the same event type or category. For example, providing an upward or downward user input, such as scrolling or gesturing up or down on a touch screen, may cause a transition between maps of different events of the same type or category that occurred on same or different dates. In one embodiment, the maps of the same type are ordered in chronological order, and transitioning between the maps includes navigating from one map to a chronologically adjacent map of the same event type. In another embodiment, maps of various event types are ordered in chronological order, and one or more maps of different event types may be skipped when navigating to events of the same event type.

In one embodiment, maps of the same event type are ordered chronologically, and neighboring or chronologically adjacent maps of the same event type as a current map are pre-loaded upon display of the current map and/or prior to a navigational user input that causes one of the adjacent maps to be displayed. Pre-loading the adjacent maps facilitates a smooth transition from one map to another. In one embodiment, a marked position on the map remains constant while navigating from one map to another map.

In one embodiment, a second type of user input triggers transitioning between maps of potentially different event types. For example, providing a left or right user input, such as scrolling or gesturing left or right on a touch screen, may cause a transition between maps of different events that occurred on same or different dates, regardless of event type. Optionally, the second type of user input requires navigating to a map of a different event type. For example, the second type of user input may cause skipping over maps of same event types before displaying a map of a different event type. In another embodiment, the second type of user input triggers navigating from map to map chronologically, in the order of occurrence of the event, regardless of the event type. In one embodiment, navigating chronologically from map to map includes looping to the first map when advancing beyond the last map, or, similarly, looping to the last map from the first map.

In one embodiment, maps are ordered chronologically regardless of event type, and neighboring or chronologically adjacent maps are pre-loaded upon display of a current map and/or prior to a navigational user input that causes one of the adjacent maps to be displayed. Pre-loading the adjacent maps facilitates a smooth transition from one map to another. In one embodiment, a marked position on the map remains constant while navigating from one map to another map.

In one embodiment, maps of same event types and/or of different event types are ordered in a user-specified or predetermined order other than chronological order. In one example, events are ordered in terms of the magnitude of the measurements. Navigating through the events may include navigating from events with measurements of a greater magnitude to events with measurements of a lesser magnitude. In another example, certain types of events may be grouped together, and other types of events may be grouped together. In yet another example, events associated with a particular user may be grouped together, and events associated with another particular user may be grouped together. Even though a total corpus of events may include events more than one group, navigating through the events may be confined to navigating through only one of the groups of events.

In one embodiment, navigation according to the at least two types of user input allows a user to rapidly browse through and display greater numbers of maps in shorter amounts of time without requiring the user to provide numerous instances of user input to navigate through a hierarchy of file menus in between viewing each map.

Sample Event Types

Sample agricultural event types may include, but are not limited to a harvest event type, a tillage event type, an event type for application of a substance, a seeding event type, an irrigation event type, a drainage event type, a scouting event type, a survey event type, or a testing event type. The harvest events may include combine events, chop events, bale events, cut events, pick events, or gather events. Tillage events may include cultivate events, plow events, disc events, bed events, list events, ridge events, rip events, or chisel events. Application events may include application of herbicide, insecticide, fertilizer, fungicide, or growth regulator. Seeding events may include plant events, sow events, drill events, spread events, set events, and transplant events. Other event types include irrigation and drainage events, natural events such as rainfall, humidity, and sun protection factor, scouting events, survey events, prune events, thin events, top events, soil test events, tissue test events, staging events, stand count events, and tree count events.

Other types of events are also contemplated by this disclosure, including, but not limited to, events in forestry, oil and gas exploration, construction, and insurance adjustment. For example, an insurance adjuster may visit a parcel of land and use a mapping application as described herein to browse historical data about inputs and/or outputs for the piece of land, and browse or update data about crop losses for the piece of land. As another example, work on a water line, and work on a sewer line may be different types of events on a strip of land where the water and sewer lines run. Several water line events and several sewer line events may have occurred over the last ten years. The techniques described herein may be used to efficiently view these different types of events occurring at different dates. In yet another example, work on power lines may be one type of event, and work on roads may be another type of event. Any number of types of events may be viewed through the map interface.

Illustrated Examples

Figure 1:
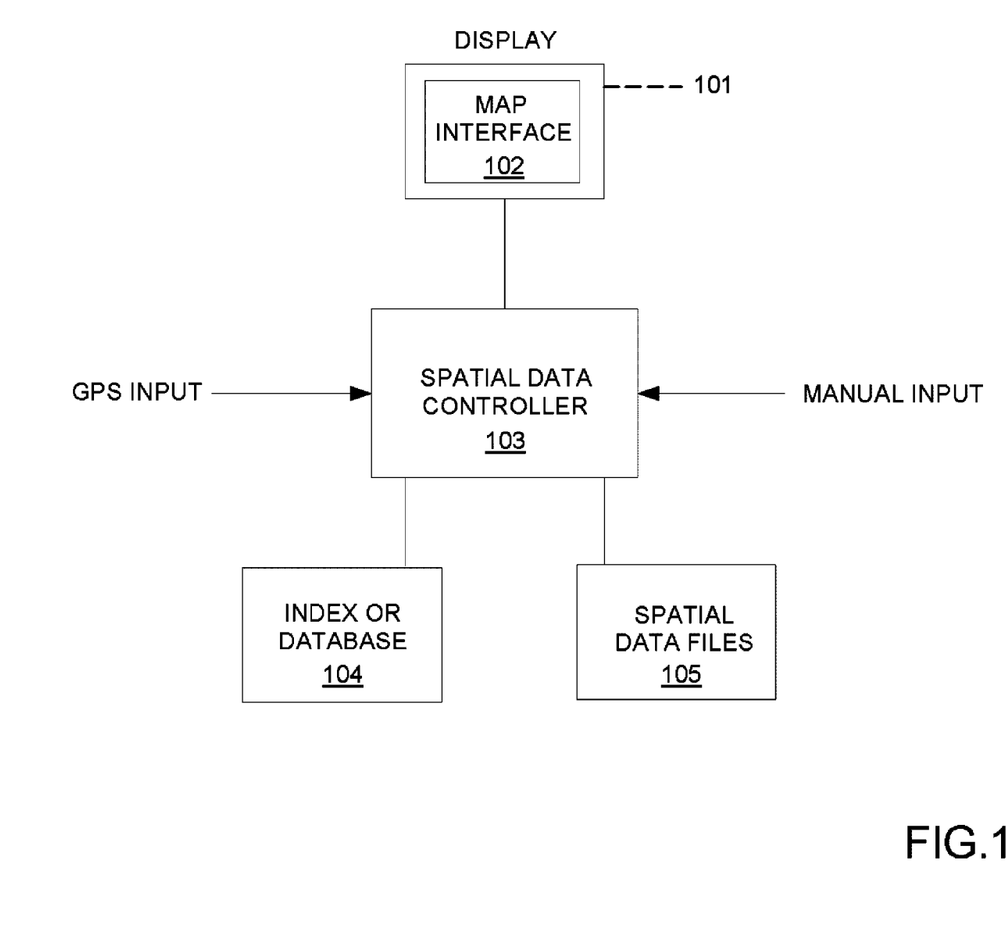
FIG. 1 is a block diagram of an example computing device configured to store, categorize, select, and display spatial data that is generated from measurements of a variety of events that occurred on a variety of dates.

FIG. 1 is a block diagram of an example computing device configured to store, categorize, select, and display spatial data that is generated from measurements of a variety of events that occurred on a variety of dates. The computing device may include a PDA, mobile device, mobile task controller, desktop computer, notebook computer, tablet computer, or any other computing device. As shown, the computing device includes a spatial data controller 103 configured to manage spatial data operations on the computing device. The spatial data controller 103 may receive manual input or GPS input. Manual inputs may include but are not limited to pointing devices, touch pads, touch screens, scroll wheels, keyboards, styluses, joysticks, control pads, other pointing mechanisms, a microphone and speech-to-text logic for receiving voice commands, or a camera, object recognition logic, and motion detection logic for capturing body gestures or eye movements, or any input originating from a user. GPS input provides, but is not limited to, a GPS coordinate location. Inputs may be used to update location position within a specific spatial data record or map or to select one or more measurements or points on a map. Inputs may also be used to trigger navigation among spatial data records or maps.

As shown, the spatial data controller 103 is connected to an index or database 104. The index or database 104 stores information associated with spatial data files 105. The index or database 104 also stores the chronological order or user-defined order of spatial data events. The index or database 104 may be stored on a non-transitory computer-readable medium such as a memory module on the computing device or may be accessed remotely via a wired or wireless connection.

In one embodiment, spatial data files 105 comprise map data and tabular data that are related through a common coordinate system. Spatial data files 105 may be stored on a non-transitory computer-readable storage medium such as a memory module on the computing device or may be accessed remotely via a wired or wireless connection.

As shown, the spatial data controller is also connected to a display 101 containing a map interface 102. In one embodiment, the display includes an integrated device display. In another embodiment, the display is remote to a device that runs mapping software for sending images to the display. In one embodiment, the map interface 102 is a graphical user interface that displays and updates spatial data, based on GPS or manual inputs.

Figure 2:
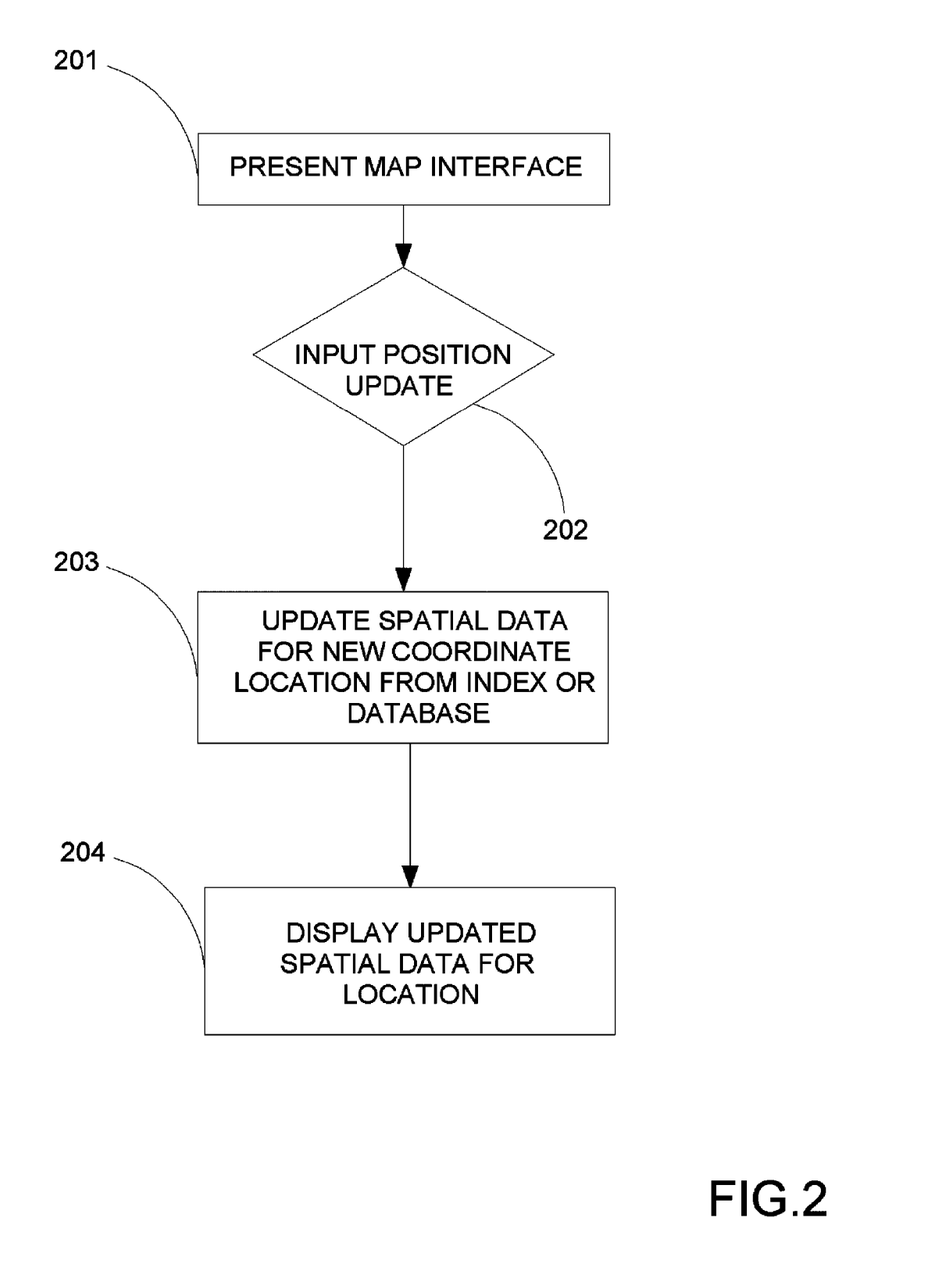
FIG. 2 is a flow chart that illustrates an example process of displaying spatial data based on manual or GPS input position updates.

FIG. 2 is a flow chart that illustrates an example process of displaying spatial data based on manual or GPS input position updates. In one embodiment, the map interface 201 is a graphical user interface that displays spatial data with a marked position that is updated based on GPS or manual input updates. When an input position update 202 is received, the method continues to block 203. In block 203 the new position update is matched against a known coordinate system and the index or database that stores information associated with the spatial data files. After matching the position update location and the associated spatial data information, the method proceeds to block 204. In block 204 the updated spatial data information is displayed for the newly updated location. For example, a first map may be replaced by a second map when a user transitions from one tract of land to another tract of land.

Figure 3A:
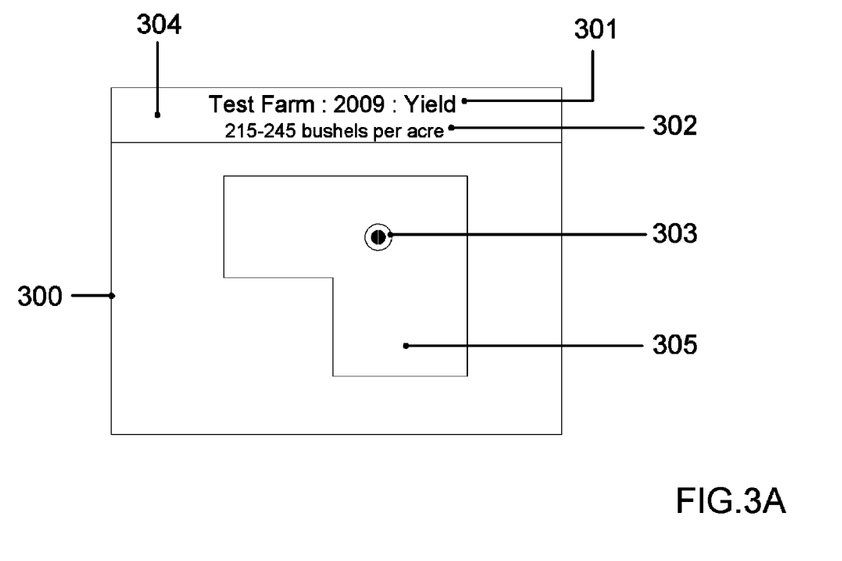
Figure 3B:
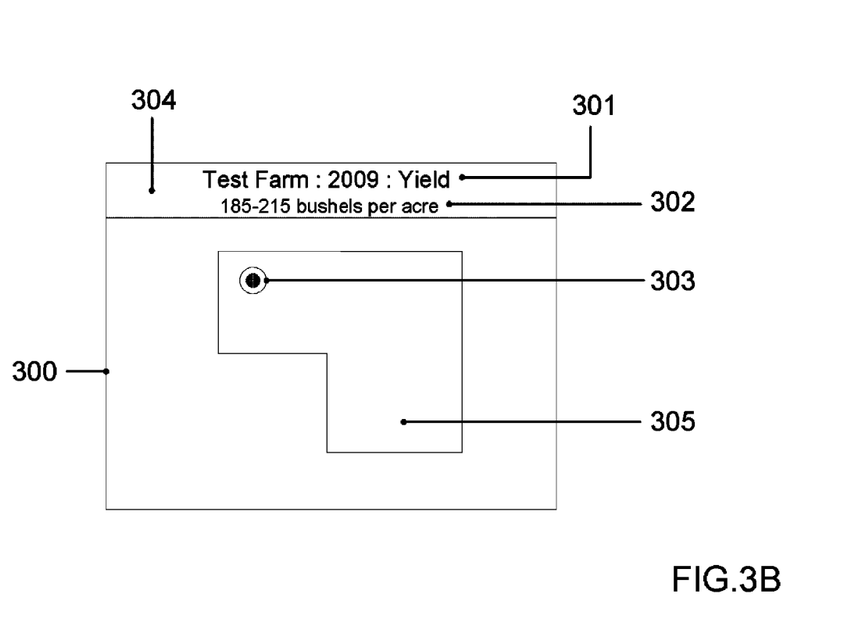
Figure 3C:
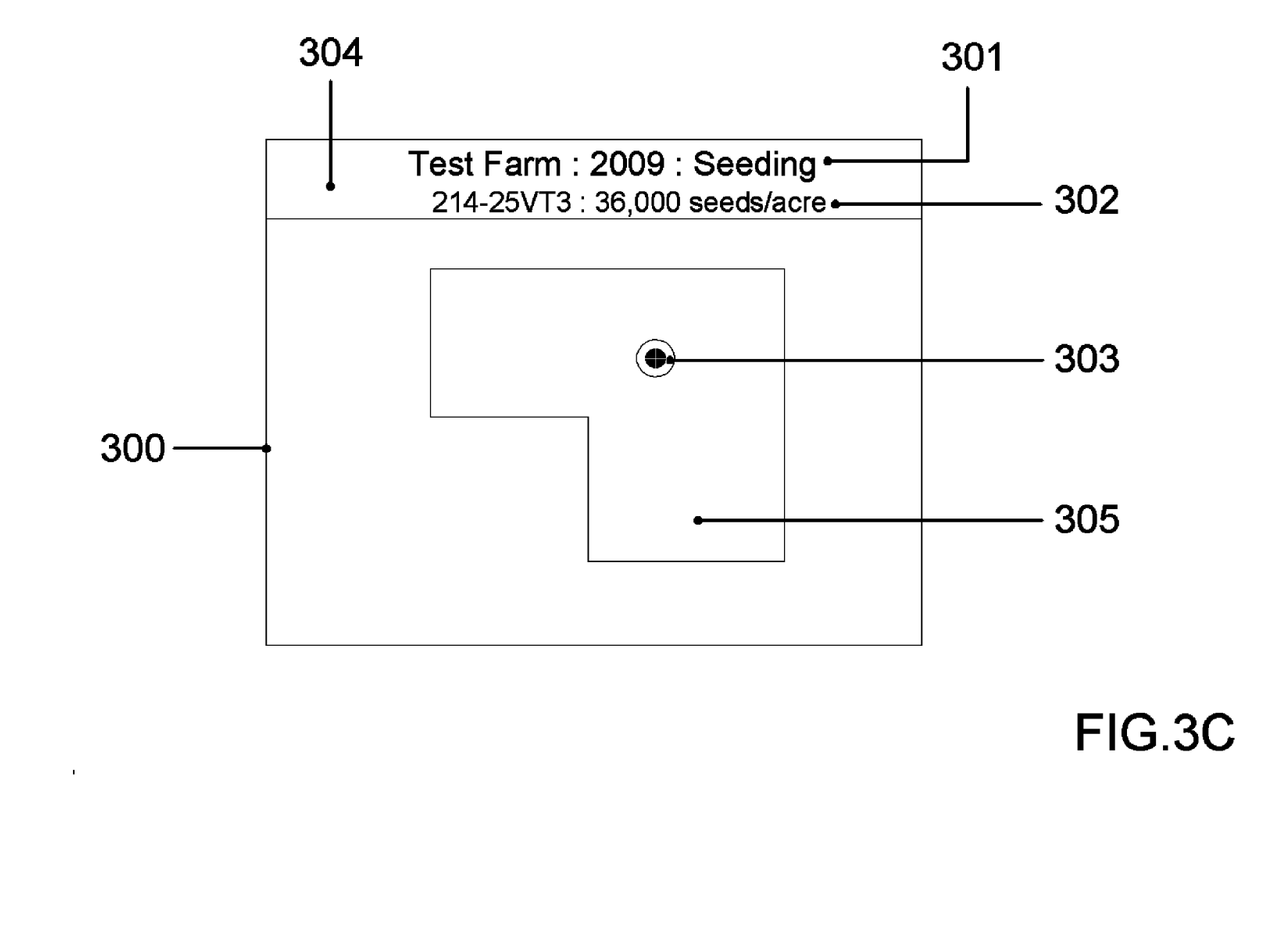

Each of FIGS. 3A-C is a diagram that illustrates an example map interface for displaying spatial data that is generated from measurements of an event associated with a particular date. In FIG. 3A-C, the map interface 300 includes an information bar 304, event type information 301, tabular data 302, a cursor 303, and a map 305.

In FIG. 3A-B the information bar 304 consists of 2 components, the event type 301 and tabular data 302. The event type 301 displays what the type of event for which measurements are currently being displayed. The tabular data 302 is a display of the tabular data corresponding to the cursor 303 location. The cursor location is changed by manual or GPS location input updates. The map 305 is a display of the map portion of the spatial data files 105 of FIG. 1.

In FIG. 3B the cursor 303 location has changed based on an input update. Through the process depicted in FIG. 2, the tabular data 302 associated to the new map location is updated to a new value from the index or database.

In FIG. 3C, a browsing input update has been received and the event type 301 and tabular data 302 have changed. The cursor 303 location has remained the same as FIG. 3A. For example, the browsing input may have been a single instance of user input of an input type that causes a transition between maps regardless of event type.

Figure 4:
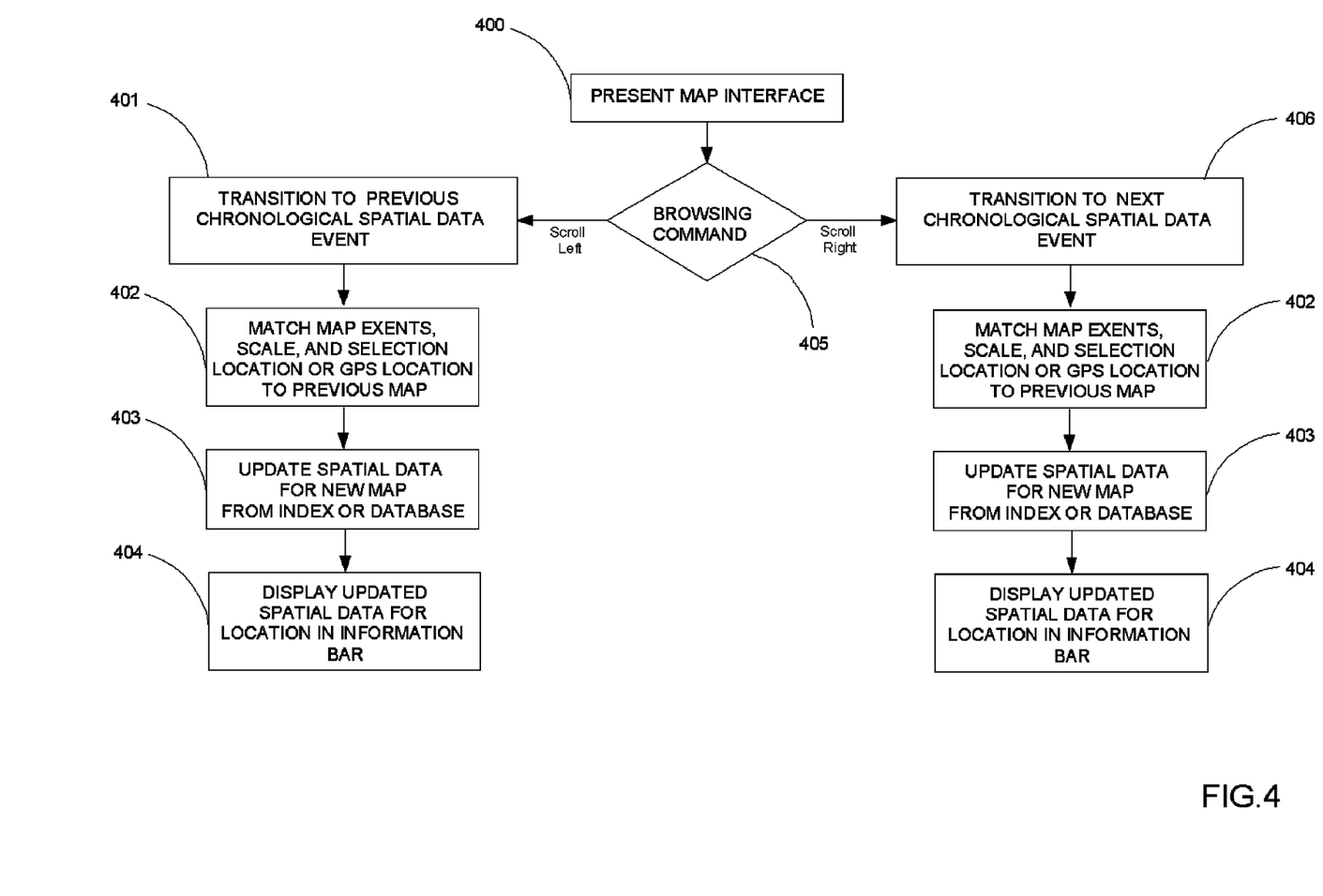
FIG. 4 is a flow chart that illustrates an example process of browsing events of a variety of event types in chronological order.

FIG. 4 is a flow chart that illustrates an example process of browsing events of a variety of event types in chronological order. Block 400 represents a current map interface. When a browsing input command 405 is received, a determination is made to transition to the next or previous chronological spatial data event. For example, a browsing input oriented to the right or down may cause a transition to a next chronological spatial data event; whereas, a browsing input oriented to the left or up may cause a transition to a previous spatial data event.

Figure 5:
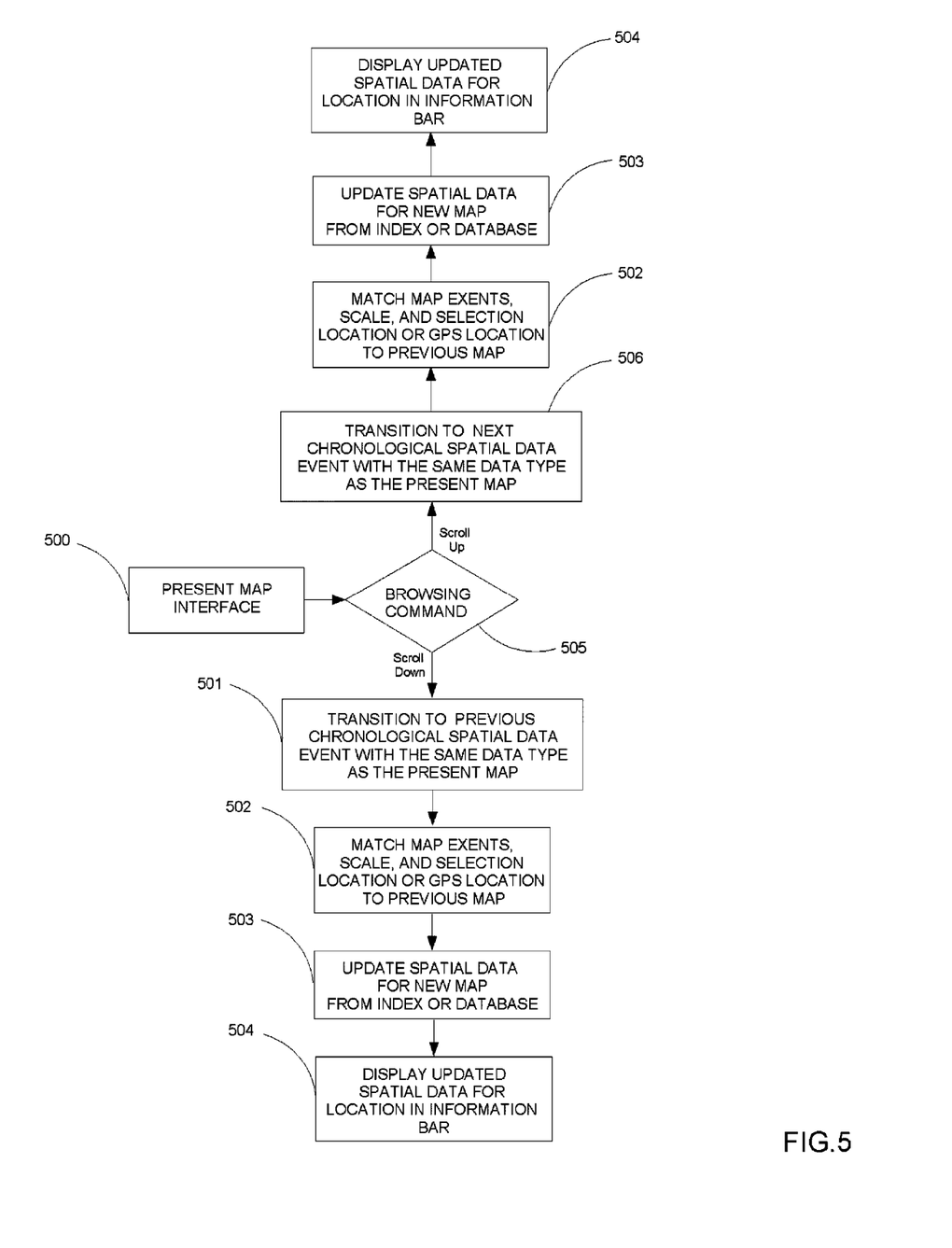
FIG. 5 is a flow chart that illustrates an example process of browsing events that are confined to a particular event type.

FIG. 5 is a flow chart that illustrates an example process of browsing events that are confined to a particular event type. Block 500 represents a current map interface. When a browsing input command 505 is received, a determination is made to transition to the next or previous spatial data event with the same event type. In one embodiment, a browsing input oriented up or down triggers navigation between items of the same event type, and a browsing input oriented left or right triggers navigation between items regardless of event type. In another embodiment, the browsing input oriented up or down triggers navigation regardless of event type, and the browsing input oriented left or right triggers navigation for the same event type.

Figure 6:
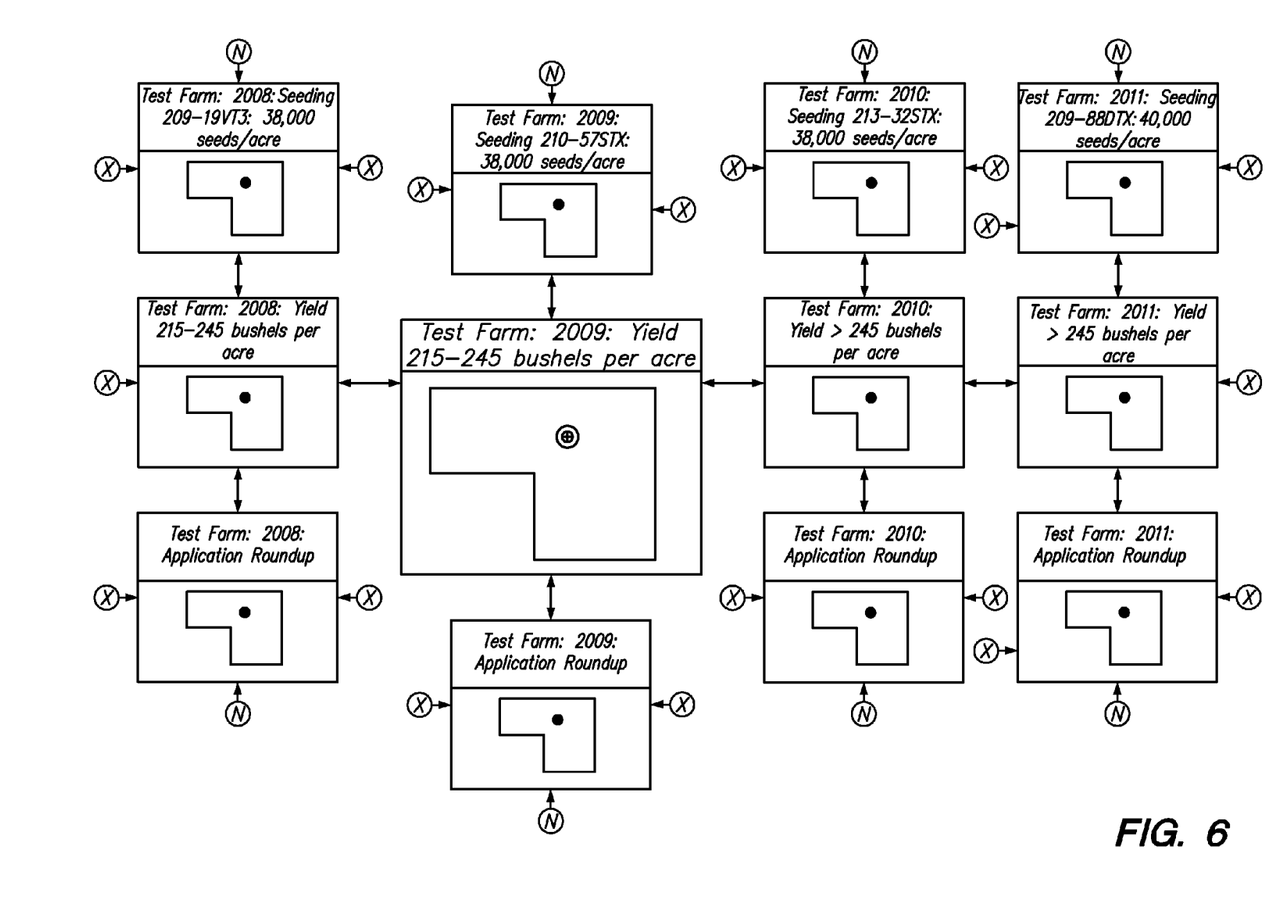
FIG. 6 is a diagram that illustrates an example process for transitioning between maps in response to a single instance of user input of either a first input type or a second input type.

FIG. 6 is a diagram that illustrates an example process for transitioning between maps in response to a single instance of user input of either a first input type or a second input type. As shown, a currently displayed map shows the information for a 2009 yield event. A single instance of user input of a first input type such as a horizontal swipe to the left or right causes navigation to another map of a yield event. For example, a swipe from the right to the left transitions the screen to a map of a 2010 yield event. A swipe from the left to the right transitions the screen to a map of a 2008 yield event. In the example, the horizontally adjacent events are chronologically ordered from 2008 to 2011.

A single instance of user input of a second input type such as a vertical swipe up or down causes navigation to another map of potentially a different event type. As shown, a swipe from down to up transitions the screen to a map of a 2009 application event, and a swipe from up to down transitions the screen to a map of a 2009 seeding event.

Figure 7:
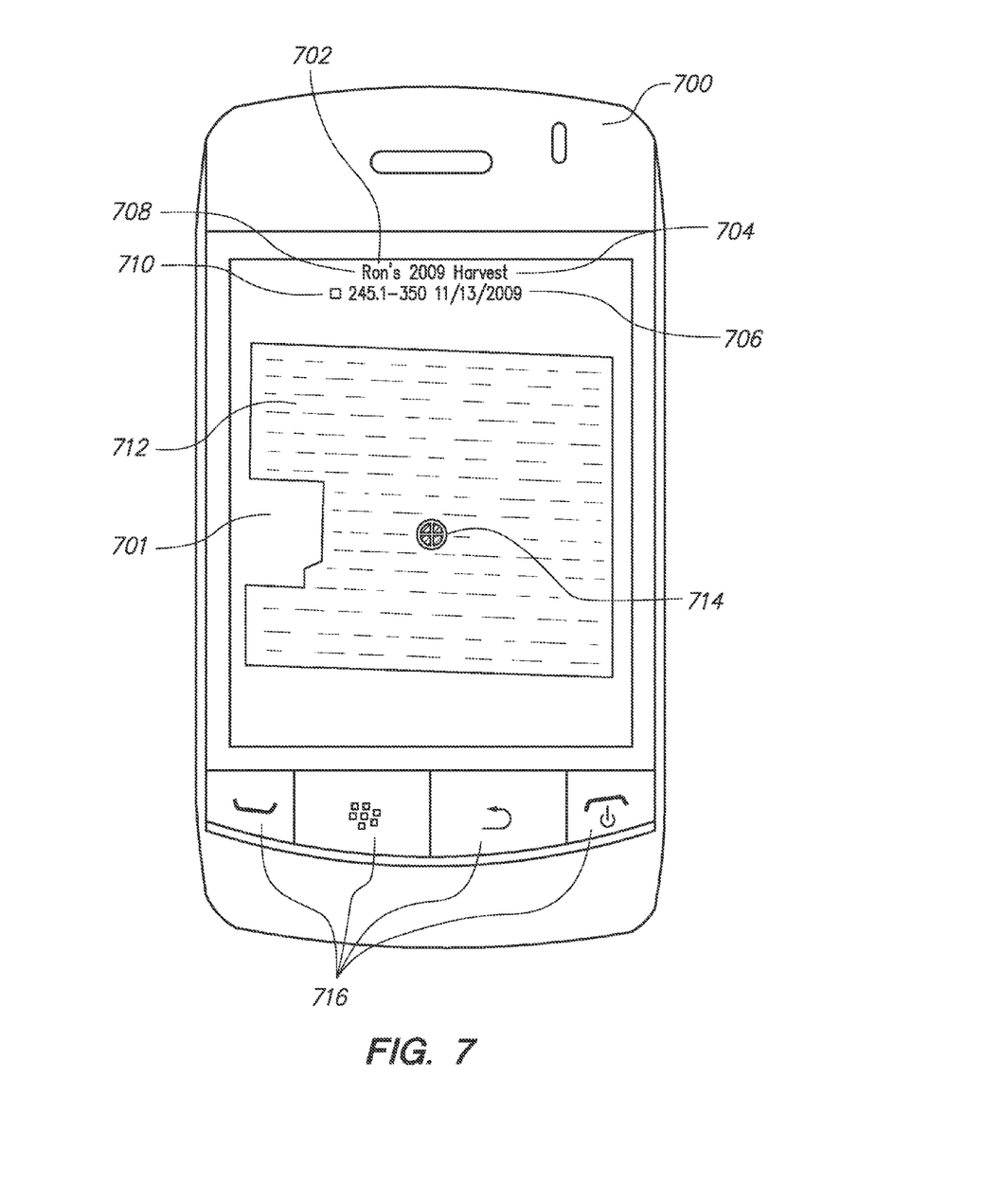
FIG. 7 illustrates an example map interface for displaying a variety of measurements for an event that occurred on a particular date.

FIG. 7 illustrates an example map interface for displaying a variety of measurements for an event that occurred on a particular date. A mobile device 700 includes a display 701 for displaying a map 712 of a variety of measurements for an event. Display 701 also displays an information bar 702. Information bar 702 shows an event name 708 and an event type 704. Information bar 702 also includes tabular data 710 and a date 706 on which the event occurred on the mapped piece of land. Tabular data 710 corresponds to information about a measurement at cursor 714. The mobile device also includes buttons 716, which may be used for navigation. For example, outer buttons may trigger navigation regardless of event type, and inner buttons may trigger navigation in a manner that preserves the event type. In this case, the inner buttons would trigger navigation to other Harvest events that likely occurred on other dates, before or after Nov. 13, 2009.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
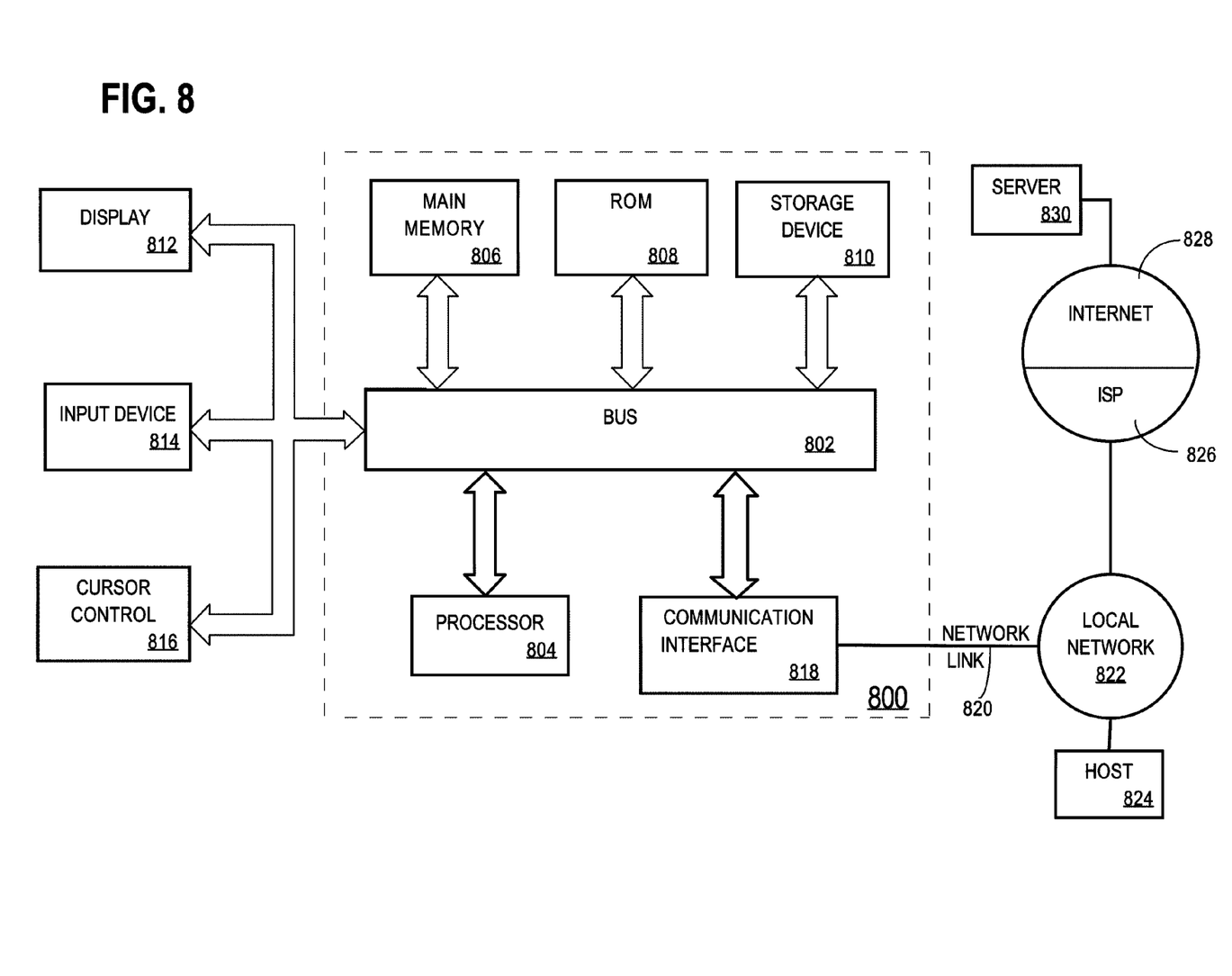
FIG. 8 is a diagram that illustrates an example computer system for executing instructions to browse maps that reflect measurements of a variety of events that occurred on a variety of dates.

For example, FIG. 8 is a diagram that illustrates an example computer system for executing instructions to browse maps that reflect measurements of a variety of events that occurred on a variety of dates. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising: storing: a first plurality of measurements for events of a first event type on a piece of land, wherein each of the events of the first event type is associated with a date of a first plurality of dates; and a second plurality of measurements for events of a second event type on the piece of land, wherein each of the events of the second event type is associated with a date of a second plurality of dates; receiving location information; causing a first map to be displayed, the first map comprising: a marked position that corresponds to the location information; and for a first event of the first event type, a first graphical representation of a first measurement of the first plurality of measurements, wherein the first event is associated with a first date of the first plurality of dates; receiving a single instance of user input of a first directionally oriented input type or a second directionally oriented input type; wherein the single instance of user input is determined to be of the first directionally oriented input type or of the second directionally oriented input type based on a directional orientation of the single instance of user input, and the first directionally oriented input type and the second directionally oriented input type are different directions; if the single instance of user input is of the first directionally oriented input type, in response to the single instance of user input, causing a second map to be displayed, the second map comprising: the marked position; for a second event of the first event type, a second graphical representation of a second measurement of the first plurality of measurements, wherein the second event is associated with a second date of the first plurality of dates; the second date associated with the second event and the first date associated with the first event are different dates; if the single instance of user input is of the second directionally oriented input type, in response to the single instance of user input, causing a third map to be displayed, the third map comprising: the marked position; and for a third event of the second event type, a third graphical representation of a third measurement of the second plurality of measurements, wherein the third event is associated with a third date of the second plurality of dates; wherein the method is performed by one or more computing devices; wherein at least the second date is chronologically adjacent to the first date in the first plurality of dates, and wherein the at least the second map is loaded into memory prior to receiving the single instance of user input; wherein the first plurality of dates and the second plurality of dates are ordered in a list of dates, wherein at least the third date is chronologically adjacent to the first date in the list of dates, and wherein the at least the third map is loaded into memory prior to receiving the single instance of user input.

2. The method of claim 1, wherein the second date is chronologically adjacent to the first date in the first plurality of dates.

3. The method of claim 1, wherein the first plurality of dates and the second plurality of dates are ordered in a list of dates, and wherein the third date is chronologically adjacent to the first date in the list of dates.

4. The method of claim 1, wherein the single instance of user input is one of a click, a touch gesture, a tap, a button press, a voice command, a body gesture, or an eye movement.

5. The method of claim 1, wherein the second date is before the third date, and wherein causing the third map to be displayed in response to the single instance of user input of the second directionally oriented input type comprises skipping the second map to find a map with a measurement for an event with a different event type than the first event.

6. The method of claim 1, wherein the location information is a global positioning system position, and wherein the location information is received from a global positioning system device that is located on the piece of land.

7. The method of claim 1, wherein the first measurement comprises a plurality of measurements for the first event that occurred on the first date on the piece of land, wherein the second measurement comprises a plurality of measurements for the second that occurred on the second date on the piece of land, and wherein the third measurement comprises a plurality of measurements for the third event that occurred on the third date on the piece of land.

8. The method of claim 1, wherein the first event type is one of a harvest event type, a tillage event type, an event type for application of a substance, a seeding event type, an irrigation event type, a drainage event type, a scouting event type, a survey event type, or a testing event type, and wherein the second event type is another of the harvest event type, the tillage event type, the event type for application of a substance, the seeding event type, the irrigation event type, the drainage event type, the scouting event type, the survey event type, or the testing event type.

9. The method of claim 1, wherein the single instance of user input of the first directionally oriented input type comprises user input that is associated with a first direction, and wherein the single instance of user input of the second type comprises user input that is associated with a second direction that is not aligned with the first direction.

10. The method of claim 1, wherein the single instance of user input is touch input that may be received anywhere on the display.

11. The method of claim 1, wherein the single instance of user input is a swipe.

12. The method of claim 1, wherein the single instance of user input is directional gesture input.

13. The method of claim 1, wherein the single instance of user input of the first directionally oriented input type comprises user input that is one of horizontal or vertical, and wherein the single instance of user input of the second directionally oriented input type comprises user input that is a different one of horizontal or vertical.

14. The method of claim 1, wherein the single instance of user input is a first single instance of user input, further comprising causing re-display of the first map in response to receiving a second single instance of user input that is of a same directionally oriented input type as the first single instance of user input and in a direction that is opposite to the first single instance of user input.

15. One or more non-transitory computer-readable storage media storing instructions, which, when executed by one or more processors, cause performance of: storing: a first plurality of measurements for events of a first event type on a piece of land, wherein each of the events of the first event type is associated with a date of a first plurality of dates; and a second plurality of measurements for events of a second event type on the piece of land, wherein each of the events of the second event type is associated with a date of a second plurality of dates; receiving location information; causing a first map to be displayed, the first map comprising: a marked position that corresponds to the location information; and a first graphical representation of a first measurement of the first plurality of measurements for a first event of the first event type, wherein the first event is associated with a first date of the first plurality of dates; receiving a single instance of user input of a first directionally oriented input type or a second directionally oriented input type; wherein the single instance of user input is determined to be of the first directionally oriented input type or of the second directionally oriented input type based on a directional orientation of the single instance of user input, the first directionally oriented input type and the second directionally oriented input type are different directions; if the single instance of user input is of the first directionally oriented input type, in response to the single instance of user input, causing a second map to be displayed, the second map comprising: the marked position; a second graphical representation of a second measurement of the first plurality of measurements for a second event of the first event type, wherein the second event is associated with a second date of the first plurality of dates; the second date associated with the second event and the first date associated with the first event are different dates; if the single instance of user input is of the second directionally oriented input type, in response to the single instance of user input, causing a third map to be displayed, the third map comprising: the marked position; and a third graphical representation of a third measurement of the second plurality of measurements for a third event of the second event type, wherein the third event is associated with a third date of the second plurality of dates; wherein at least the second date is chronologically adjacent to the first date in the first plurality of dates, and wherein the at least the second map is loaded into memory prior to receiving the single instance of user input; wherein the first plurality of dates and the second plurality of dates are ordered in a list of dates, wherein at least the third date is chronologically adjacent to the first date in the list of dates, and wherein the at least the third map is loaded into memory prior to receiving the single instance of user input.

16. The one or more non-transitory computer-readable storage media of claim 15, wherein the second date is chronologically adjacent to the first date in the first plurality of dates.

17. The one or more non-transitory computer-readable storage media of claim 15, wherein the first plurality of dates and the second plurality of dates are ordered in a list of dates, and wherein the third date is chronologically adjacent to the first date in the list of dates.

18. The one or more non-transitory computer-readable storage media of claim 15, wherein the single instance of user input is one of a click, a touch gesture, a drag, a tap, a button press, a voice command, a body gesture, or an eye movement.

19. The one or more non-transitory computer-readable storage media of claim 15, wherein the second date is before the third date, and wherein causing the third map to be displayed in response to the single instance of user input of the second input type comprises skipping the second map to find a map with a measurement for an event with a different event type than the first event.

20. The one or more non-transitory computer-readable storage media of claim 15, wherein the location information is a global positioning system position, and wherein the location information is received from a global positioning system device that is located on the piece of land.

21. The one or more non-transitory computer-readable storage media of claim 15, wherein the first measurement comprises a plurality of measurements for the first event that occurred on the first date on the piece of land, wherein the second measurement comprises a plurality of measurements for the second event that occurred on the second date on the piece of land, and wherein the third measurement comprises a plurality of measurements for the third event that occurred on the third date on the piece of land.

22. The one or more non-transitory computer-readable storage media of claim 15, wherein the first event type is one of a harvest event type, a tillage event type, an event type for application of a substance, a seeding event type, an irrigation event type, a drainage event type, a scouting event type, a survey event type, or a testing event type, and wherein the second event type is another of the harvest event type, the tillage event type, the event type for application of a substance, the seeding event type, the irrigation event type, the drainage event type, the scouting event type, the survey event type, or the testing event type.

23. The one or more non-transitory computer-readable storage media of claim 15, wherein the single instance of user input of the first directionally oriented input type comprises user input that is associated with a first direction, and wherein the single instance of user input of the second type comprises user input that is associated with a second direction that is not aligned with the first direction.

24. The one or more non-transitory computer-readable storage media of claim 15, wherein the single instance of user input is touch input that may be received anywhere on the display.

25. The one or more non-transitory computer-readable storage media of claim 15, wherein the single instance of user input is a swipe.

26. The one or more non-transitory computer-readable storage media of claim 15, wherein the single instance of user input is directional gesture input.

27. The one or more non-transitory computer-readable storage media of claim 15, wherein the single instance of user input of the first directionally oriented input type comprises user input that is one of horizontal or vertical, and wherein the single instance of user input of the second directionally oriented input type comprises user input that is a different one of horizontal or vertical.

28. The one or more non-transitory computer-readable storage media of claim 15, wherein the single instance of user input is a first single instance of user input, further comprising causing re-display of the first map in response to receiving a second single instance of user input that is of a same directionally oriented input type as the first single instance of user input and in a direction that is opposite to the first single instance of user input.

* * * * *